Patented Mar. 24, 1936

2,035,112

UNITED STATES PATENT OFFICE 2,035,112

COMPOSITION OF MATTER OBTAINED FROM HYDROCARBON ACID SLUDGE

John C. Bird, Elizabeth, N. J., assignor to Standard Oil Development Company, a corporation of Delaware No Drawing. Application January 6, 1932, Serial No. 585,160

3 Claims. (Cl. 196—149)

This invention relates to new products obtained from hydrocarbon oil acid sludge and more particularly from the sludges obtained from asphaltic and mixed base petroleum oils. This invention relates especially to the use of these products as agents for staining and dyeing wood and in surface coating compositions generally.

When hydrocarbon oil acid sludges, such as are obtained by treating asphaltic or mixed base crudes such as Ranger and Burkburnett, heavy residual oils of high molecular weight, heavy lubricating oils and medicinal white oils, with strong or fuming sulfuric acid, are treated with water soluble organic solvents, as described in the co-pending application Serial No. 585,707 filed Jan. 9, 1932, by John C. Bird, an insoluble coagulum of a resinous or plastic nature separates from the aqueous alcoholic solution of the remaining organic matter of the sludge as a lower layer which may be separately drawn off. This material is a dark, highly viscous plastic substance of unusual qualities. It will burn only with difficulty and will not support its own combustion but automatically extinguishes itself when the igniting flame is removed.

It is suitable as a binding agent of wide application and may be used as described in the co-pending application No. 592,448 filed Feb. 11, 1932, by Bird and Winning in the preparation of compounded fibrous articles such as paper, wall board and the like containing finely divided solid organic fiber and characterized by being unable to support free flame combustion. It may also be used in impregnating wood with either volatile solvents or in admixture with high melting waxes and oils, as a staining agent, preservative and fungicide.

It has now been found that this product is especially suitable for the preparation of wood stains and similar dyeing and surface coating compositions. It is completely soluble in benzol, toluol, xylol, and other hydrocarbon solvents of high solvent power for gums, resins, nitrocellulose, etc., such as the hydroformed solvents described in the co-pending application Serial No. 583,703 filed Dec. 29, 1931, by Robert T. Haslam, and also in carbon tetrachloride, carbon disulfide and other solvents. It is partially soluble in light hydrocarbon solvents such as petroleum ether and liquefied hydrocarbon gases, and may be separated into two fractions by these solvents. Both the total product and the fraction extracted with light hydrocarbon solvents may be used in suitable solvents for the preparation of surface coating and impregnating substances generally. It may be used with volatile solvents as a stain, and in admixture with solvents, drying oils, pigments, fillers, cellulose plastics, plasticizers, resins and other materials as are used in the preparation of paints, varnishes, lacquers, and the like.

The following example illustrates a method for obtaining this improved product from acid sludge:

*Example 1.*—50 pounds of an acid sludge obtained by treating "white oil" stock with sulfuric acid was mixed with 52.5 pounds of water and agitated at about 90° C., steam being blown through the mixture to drive off the sulfur dioxide. After several hours of steaming under these conditions, the mixture was allowed to stand and settle for about 3 to 4 hours.

When the raw sludge contains a very large amount of asphaltic matter, as is found in "first treat" sludges from the first acid contact with heavy residual asphaltic or mixed base petroleum oils such as topped Ranger crude, the initial dilution with water and heating with steam may cause a separation of oil, as a supernatant layer, and of a tarry or asphaltic precipitate. It is preferred to remove both these products before proceeding with the neutralization and/or solvent extraction of the sludge.

The bottom layer containing sulfuric acid was drawn off, and the top layer was neutralized with 16.7 pounds of 50% caustic soda solution. Approximately 94 pounds of 91% isopropyl alcohol was then added, and the mixture was allowed to stand over night. Other aqueous alcohols may also be used, and the neutralizing agent may be substantially any basic compound of an alkali metal or ammonia.

On standing three layers formed. The top layer, consisting of a solution of sulfonates in aqueous alcohol, was drawn off, the alcohol recovered therefrom by distillation and the resulting liquor evaporated to dryness. A yield of 50.3% of sodium sulfonates of good color and wetting properties was obtained based on the original sludge.

The middle layer formed during the alcohol extraction consisted of the resinous plastic matter already described, with a small amount of alcohol. The bottom layer consisted of a supersaturated aqueous solution of inorganic salts. Alcohol was recovered from both of these layers by distillation.

25 parts by weight of this resinous material were dissolved in 75 parts of a mixture of benzol and "Varsol", containing equal parts of benzol and of a gasoline fraction, "Varsol", of approximately the same boiling range. This solution stains wood the color of dark oak. The stained surface is dry, firm and non-tacky under all normal temperature conditions and does not soften or become sticky even on continued exposure to direct sunlight. In contrast with this product, both petroleum resins and asphaltic substances usually give a dull and non-glossy finish and even when very dilute solutions of asphalt are used the surface is often sticky or tacky.

This resinous product obtained from acid sludge is substantially completely soluble in hydroformed solvents having a kauri butanol value above about 40 or 50 and may be used in such solvents in any desired concentration according to the intensity of color desired in the stain. A hydroformed solvent is a synthetic hydrocarbon solvent obtained by the destructive hydrogenation at elevated pressures of petroleum oil. The volatility of the solvent may also be readily adjusted as desired by distillation to produce a fraction of any suitable boiling range.

Improved stains of somewhat greater fire-resistant properties and clearer color may be prepared by utilizing only the fraction of the above resinous product soluble in petroleum ether. For example, the resinous product obtained from acid sludge as already described may be agitated with a light hydrocarbon solvent such as petroleum ether or with liquefied hydrocarbon gases such as butane or propane, and a portion of this material will be dissolved in the solvent. This light hydrocarbon soluble fraction may then be used as an improved coloring agent in stains, paints, varnishes and lacquers generally.

This invention is not to be limited to any examples which are given herein solely for purpose of illustration but only by the following claims in which I wish to claim all novelty insofar as the prior art permits.

I claim:

1. Composition of matter comprising a dry, firm and non-sticky resinous material separated from a hydrocarbon oil acid sludge and being substantially free of sulfonates, being substantially completely soluble in benzol, carbon tetrachloride, carbon disulphide and in hydro-formed solvents having a kauri butanol value above about 40, and being substantially insoluble in aqueous alcohol.

2. Composition of matter comprising that fraction of the composition claimed in claim 1 which is relatively more soluble in petroleum ether than is the remainder of said resinous material.

3. Composition of matter comprising that fraction of the composition claimed in claim 1 which is relatively more soluble in liquefied hydrocarbons of three to four carbon atoms than is the remainder of said resinous material.

JOHN C. BIRD.